US 6,525,947 B2

(12) United States Patent
Umetsu et al.

(10) Patent No.: US 6,525,947 B2
(45) Date of Patent: Feb. 25, 2003

(54) POWER SUPPLY APPARATUS AND POWER SUPPLY SYSTEM

(75) Inventors: Koji Umetsu; Masayoshi Sasaki, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/911,804

(22) Filed: Jul. 25, 2001

(65) Prior Publication Data

US 2002/0015317 A1 Feb. 7, 2002

(30) Foreign Application Priority Data

Jul. 28, 2000 (JP) ........................................ 2000-229726

(51) Int. Cl.[7] ............................................. H02M 3/335
(52) U.S. Cl. ....................................... 363/21.15; 363/65
(58) Field of Search ........................... 363/21.07, 21.15, 363/21.09, 21.17, 65, 67, 69, 70, 78, 80, 97, 131

(56) References Cited

U.S. PATENT DOCUMENTS 6,014,322 A * 1/2000 Higashi et al. ............... 363/65
6,229,723 B1 * 5/2001 Umetsu et al. ............... 363/71

* cited by examiner

*Primary Examiner*—Jeffrey Sterrett
*Assistant Examiner*—Gary L. Laxton
(74) *Attorney, Agent, or Firm*—Ronald P. Kananen, Esq.; Rader, Fishman & Grauer, PLLC.

(57) ABSTRACT

Providing a power supply system having a plurality of power supply apparatuses connected in parallel to each other, each of which is not affected by a voltage fluctuation of a reverse flow-preventive diode provided in an output line thereof, and can provide a stable output voltage controlled with high accuracy. Each of the power supply apparatuses includes a positive output terminal 33 connected to a load 13, a reverse flow-preventive diode 31 connected to the positive output terminal 33, a $V_F$ correcting circuit 46 for detecting a forward voltage of the reverse flow-preventive diode 31 and providing a controlling unit with the detected voltage in a feedback manner, an output current detecting/correcting circuit 45 for detecting a forward current of the reverse flow-preventive diode 31 and providing the controlling unit with the detected current in a feedback manner, and the controlling unit for controlling the anode potential of the reverse flow-preventive diode 31. The controlling unit controls the transformer 24 by the switching operation so that the anode potential of the reverse flow-preventive diode 31 remains constant, and drops the anode potential in accordance with the forward current of the reverse flow-preventive diode 31, and raises the anode potential in accordance with the forward voltage of the reverse flow-preventive diode 31.

8 Claims, 11 Drawing Sheets

POWER SUPPLY APPARATUS AND POWER SUPPLY SYSTEM

BACKGROUND OF THE INVENTION

1. Field of the Invention

The present invention relates to a power supply apparatus having a reverse flow-preventive diode provided in an output line thereof, and to a power supply system having a plurality of such power supply apparatuses connected in parallel to each other.

2. Description of the Related Art

There has been proposed a power supply system having a plurality of power supply apparatuses connected in parallel to each other. Since the power supply apparatuses are connected in parallel to each other, the power supply system can supply a load with a large power. And, even though any one of the power supply apparatuses fails, the failed one can be backed up by another normal one.

FIG. 1 shows a conventional power supply system having two flyback type switching converters connected in parallel to each other. The conventional power supply system is generally indicated with a reference 100.

As shown, the conventional power supply system 100 includes a first switching converter 101 and a second switching converter 102, which are connected in parallel to a load 103. The first and second switching converters 101 and 102 are identical in circuit configuration with each other. Therefore, the circuit configuration of only the first switching converter 101 will be explained hereinafter.

The first switching converter 101 includes an AC input terminal 111, an input filter 112 and a rectifying circuit 113.

The first switching converter 101 is supplied with, for example, a commercial AC power by applying a commercial AC voltage to the AC input terminal 111. The AC voltage is then applied to the input filter 112. The input filter 112 is provided to remove a power noise from the input AC voltage, and then the AC voltage with no power noise is applied to the rectifying circuit 113. The rectifying circuit 113 rectifies the AC voltage to provide a DC input voltage ($V_{in}$) of a predetermined value.

The first switching converter 101 further includes a transformer 114 having a primary winding 114a and a secondary winding 114b, a switching element 115, a pulse width modulating (PWM) circuit 116, a rectifier diode 117 and a smoothing capacitor 118.

The primary winding 114a of the transformer 114 has one end thereof connected to the rectifying circuit 113 which applies the DC input voltage ($V_{in}$) to that end of the primary winding 114a. The primary winding 114a of the transformer 114 has the other end thereof connected to the ground via the switching element 115. The switching element 115 is, for example, a field effect transistor (FET). The switching element 115 has the gate thereof connected to the PWM circuit 116, and is driven in a pulsed manner by a PWM signal supplied from the PWM circuit 116. The switching element 115 is pulse-driven by the PWM signal to switch a current through the primary winding 114a of the transformer 114.

The secondary winding 114b of the transformer 114 has one end thereof connected to the ground. The secondary winding 114b of the transformer 114 has the other end thereof connected to the anode of the rectifier diode 117. The rectifier diode 117 has the cathode thereof connected to the ground via the smoothing capacitor 118. The connection point at which the cathode of the rectifier diode 117 and the smoothing capacitor 118 are connected to each other will be referred to as D point. At the secondary winding 114b of the transformer 114, a voltage is induced from the primary winding 114a due to the switching operation of the switching element 115. The rectifier diode 117 rectifies, and smoothing capacitor 118 smooths, the voltage induced at the secondary winding 114b to generate a DC voltage ($V_P$) at the D point.

The first switching converter 101 further includes a voltage divider 119, a voltage divider 120, a differential amplifier 121 to detect output voltage error, a reference voltage source 122 to generate a reference voltage ($V_{ref}$) and a photocoupler 123 consisting of a light emitting diode 124 and a phototransistor 125.

The voltage dividers 119 and 120 are connected in series between the D point and ground. The differential amplifier 121 has an inverting input terminal connected to a connection point between the voltage dividers 119 and 120, and has a non-inverting input terminal connected to a positive terminal of the reference voltage source 122. The reference voltage source 122 has a negative terminal connected to the ground. The light emitting diode 124 of the photocoupler 123 has the anode and cathode thereof connected to the D point and the output terminal of the differential amplifier 121, respectively. The phototransistor 125 of the photocoupler 123 has the emitter and collector thereof connected to the ground and PWM circuit 116, respectively.

The differential amplifier 121 is supplied at the inverting input terminal thereof with a DC voltage ($V_P$) produced by dividing the DC voltage ($V_P$) at the D point at a ratio of voltage division between the voltage dividers 119 and 120. Also, the differential amplifier 121 is supplied at the non-inverting input terminal thereof with a reference voltage ($V_{ref}$) generated by the reference voltage source 122. The differential amplifier 121 amplifies a difference in voltage between the non-inverting and inverting input terminals thereof to provide a difference voltage, namely, an error voltage, between the voltage-divided DC voltage ($V_P$) and reference voltage ($V_{ref}$). The error voltage is applied to the PWM circuit 116 via the photocoupler 123. The PWM circuit 116 varies, based on the error voltage, the duty ratio of the PWM signal and switches the switching element 115 such that the DC voltage ($V_P$) at the D point is stabilized at a constant level.

The first switching converter 101 further includes a reverse flow-preventive diode 126, an output resistor 127, a positive output terminal 128 and a negative output terminal 129. The reverse flow-preventive diode 126 has the anode thereof connected to the D point and the cathode thereof connected to the positive output terminal 128 via the output resistor 127. The negative output terminal 129 is connected to the ground.

The conventional power supply system 100 has the first and second switching converters 101 and 102 connected in parallel to each other, and supplies the load 103 with a power.

More specifically, the positive output terminal 128 of the first switching converter 101 and the positive output terminal 128 of the second switching converter 102 are connected to each other and to the positive power input terminal 104 of the load 103. Furthermore, the negative output terminal 129 of the first switching converter 101 and the negative output terminal 129 of the second switching converter 102 are connected to each other and to the negative power input terminal 105 of the load 103.

As in the above, the conventional power supply system 100 supplies the load 103 with a power which is larger than that generated by one switching converter.

Generally, in case a plurality of power supply apparatuses are connected in parallel to each other, there takes place a very small difference in output voltage between the power supply apparatuses.

Thus, in the conventional power supply system 100, the reverse flow-preventive diode 126 is provided to prevent a current from flowing from the switching converter which generates a high voltage to the switching converter which generates a low voltage, and the output resistor 127 is provided to absorb the potential difference, to minimize the difference between the currents supplied from the two switching converters 101 and 102, respectively, to the load 103 and to supply a power to the load 103 very efficiently.

It is assumed now that the voltage ($V_P$) generated at the D point of the first switching converter 101 has a value $V_{P1}$ voltage ($V_P$) generated at the D point of the second switching converter 102 has a value $V_{P2}$ and that $V_{P1} < V_{P2}$. It is also assumed that a DC current $I_1$ is delivered at the positive output terminal 128 of the first switching converter 101, and a DC current $I_2$ is delivered at the positive output terminal 128 of the second switching converter 102.

In this case, if the reverse flow-preventive diode 126 is not provided in the power supply system 100, a part (reverse flow $I_r$) of the DC current $I_2$ from the second switching converter 102 flows into the voltage dividers 119 and 120 of the first switching converter 101, thus generating unstable DC voltage ($V_{P1}$), which is not constant, at the D point. However, since the first switching converter 101 has the reverse flow-preventive diode 126, the reverse flow $I^r$ will not flow into the voltage dividers 119 and 120, thus a constant and stable DC voltage ($V_{P1}$) is generated at the D point.

Further, if the output resistor 127 is not provided in the power supply system 100, the second switching converter 102 in which DC voltage ($V_P$) at the A point is high, will provide 100% of a load current $I_0$, while the first switching converter 101 in which DC voltage ($V_P$) at the A point is low, will provide no load current $I_0$. In the power supply system 100, however, as the DC currents $I_1$ and $I_2$ output from the positive output terminals 128, respectively, increase, a voltage ($V_R$) generated across the output resistor 127 increases, while an output voltage ($V_S$) generated at the positive output terminal 128 drops linearly. Accordingly, both the first switching converter 101 and second switching converter 102 in the power supply system 100 will evenly contribute themselves to supply of the load current $I_0$.

FIG. 2 shows a relationship between the output currents $I_1$, $I_2$ from the first switching converters 101 and 102, and the output voltage ($V_S$) supplied from the power supply system 100 to the load 103.

As shown in FIG. 2, even if there is generated a very small difference between the voltage $V_{P1}$ at the D point of the first switching converter 101 and the voltage $V_{P2}$ at the D point of the second switching converter 102, the output resistor 127 causes a linear voltage drop ($V_R$) since the output resistor 127 is provided between the D point and the positive output terminal 128. Thus, also when the output voltage ($V_S$) applied from the positive output terminal 128 to the load 103 is constant, a current for supply to the load 103 is supplied from each of the first switching converter 101 and second switching converter 102. Specifically, when the output voltage ($V_S$) is, for example, 12V, the first switching converter 101 will provide an output current of 4A from the positive output terminal 128 thereof, while the second switching converter 102 will provide an output current of 6A from the positive output terminal 128 thereof. In case the resistance value of the output resistor 127 is larger, the ratio of the voltage drop caused by the output resistor 127 becomes large, while the difference between output currents provided by the first switching converter 101 and second switching converter 102 are reduced, as shown FIG. 3.

As in the above, there is provided a reverse flow-preventive diode 126 in either of the first and second switching converters 101 and 102. Like the output resistor 127, the reverse flow-preventive diode 126 has such a nature that when the current through the reverse flow-preventive diode 126 has a larger value than predetermined, a drop voltage ($V_F$) increases in proportion to the flowing current. Thus, when the output current value is larger than predetermined, the reverse flow-preventive diode 126 can drop the output voltage ($V_S$) at the positive output terminal 128 linearly similarly to the output resistor 127.

The drop $V_{dp}$ of the output voltage ($V_S$) supplied from the positive output terminal 128 of each of the first and second switching converters 101 and 102 will be as follows in case the reverse flow-preventive diode 126 and output resistor 127 are provided in each switching converter.

$$V_{dp} = V_F + V_R$$

When the current through the reverse flow-preventive diode 126 has a smaller value than predetermined, the ratio of the drop voltage ($V_F$) will be large, and the drop voltage ($V_F$) does not increase in proportion to the flowing current. Specifically, FIG. 4 shows the volt-ampere characteristics of a Schottky diode. When the current through the Schottky diode is smaller than 2A, the voltage varies significantly larger than the current, as shown in FIG. 4.

Furthermore, the temperature characteristics of the reverse flow-preventive diode 126 of the first switching converter 101 and that of the second switching converter 102 are not identical with each other, or have some errors. Also, the output characteristics of the reverse flow-preventive diode 126 is affected by the environmental temperature and chronological change. Similarly, the temperature characteristics of the output resistor 127 of the first switching converter 101 and that of the second switching converter 102 are not identical with each other, or have some errors.

Thus, in the power supply system 100, since the voltage drop of each of the power supply apparatuses is not linear, there is cause a large difference between the DC current $I_1$ from the first switching converter 101 and DC current $I_2$ from the second switching converter 102, and thus one of the switching converters 101 and 102 will be more contributed to providing the load current $I_0$ than the other. This one-sided contribution to providing the load current $I_0$ will adversely affect the product reliability.

OBJECT AND SUMMARY OF THE INVENTION

It is therefore an object of the present invention to overcome the above-mentioned drawbacks by providing a power supply apparatus which is not affected by a voltage fluctuation of a reverse flow-preventive diode provided in an output line thereof, and can provide a stable output voltage controlled with high accuracy, and a power supply system having a plurality of such power supply apparatuses connected in parallel to each other.

According to the present invention, there is provided a power supply apparatus including:

a DC voltage source;

an output terminal to supply a power to an external load, the external load being connected to the output terminal;

a diode provided between the DC voltage source and the output terminal, the diode having the anode thereof connected to the DC voltage source and having the cathode thereof connected to the output terminal;

means for detecting a forward voltage of the diode;

means for detecting a forward current of the diode; and means for controlling a DC voltage generated from the DC voltage source;

the control means controlling a DC voltage generated from the DC voltage source so that the anode potential of the diode remains constant, and dropping the output terminal voltage in accordance with the forward current detected by the forward current detection means, and raising the anode potential of the diode in accordance with the forward voltage detected by the forward voltage detection means.

In the power supply apparatus, the diode provided between the DC voltage source and the output terminal works as a reverse flow-preventive diode. And a DC voltage generated from the DC voltage source is controlled so that the anode potential of the diode remains constant, and the output terminal voltage is dropped in accordance with the forward current detected by the forward current detection means, and the anode potential of the diode is raised in accordance with the forward voltage detected by the forward voltage detection means.

According to the present invention, there is also provided a power supply system having a plurality of power supply apparatuses connected in parallel to an external load, each of the power supply apparatuses including:

a DC voltage source;

an output terminal to supply a power to an external load, the external load being connected to the output terminal;

a diode provided between the DC voltage source and the output terminal, the diode having the anode thereof connected to the DC voltage source and having the cathode thereof connected to the output terminal;

means for detecting a forward voltage of the diode;

means for detecting a forward current of the diode; and means for controlling a DC voltage generated from the DC voltage source;

the control means controlling a DC voltage generated from the DC voltage source so that the anode potential of the diode remains constant, and dropping the output terminal voltage in accordance with the forward current detected by the forward current detection means, and raising the anode potential of the diode in accordance with the forward voltage detected by the forward voltage detection means.

In the power supply system, the diode provided between the DC voltage source and the output terminal of each of the power supply apparatuses works as a reverse flow-preventive diode. And a DC voltage generated from the DC voltage source is controlled so that the anode potential of the diode remains constant, and the output terminal voltage is dropped in accordance with the forward current detected by the forward current detection means, and the anode potential of the diode is raised in accordance with the forward voltage detected by the forward voltage detection means.

DETAILED DESCRIPTION OF THE PREFERRED EMBODIMENTS

Figure 1:
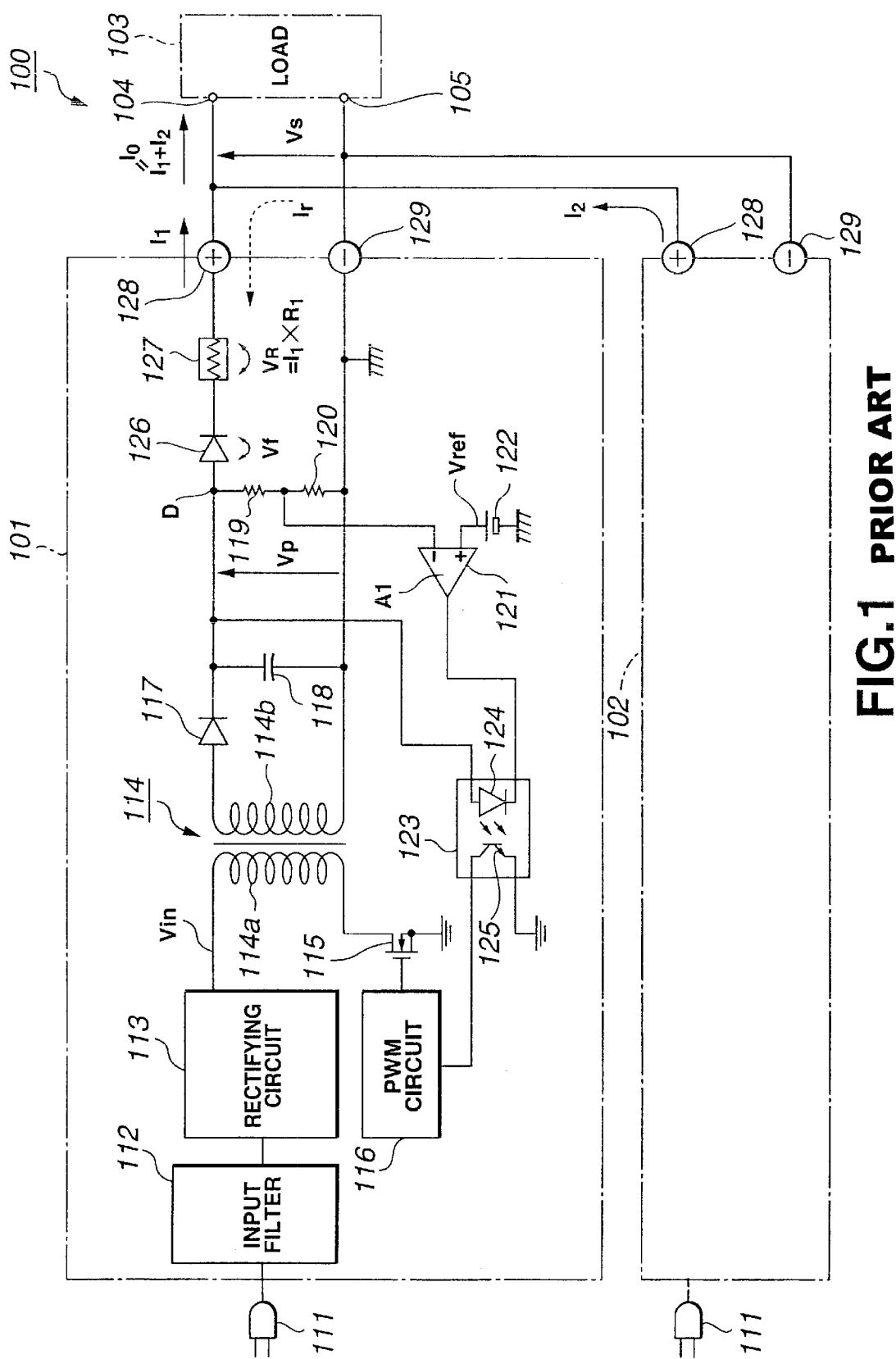
FIG. 1 shows a circuit diagram of a conventional power supply system.
Figure 2:
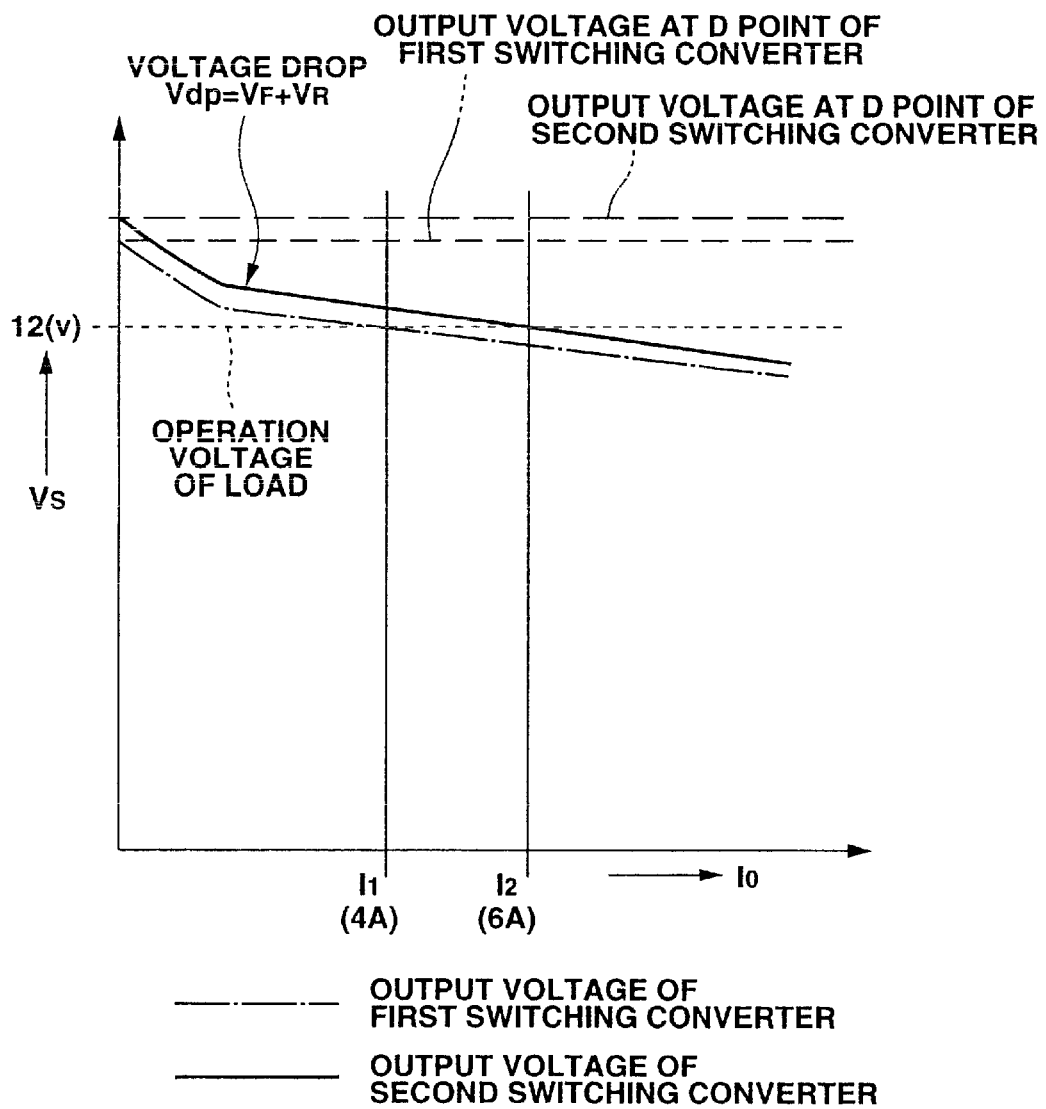
FIG. 2 shows the output characteristics of the conventional power supply system.
Figure 3:
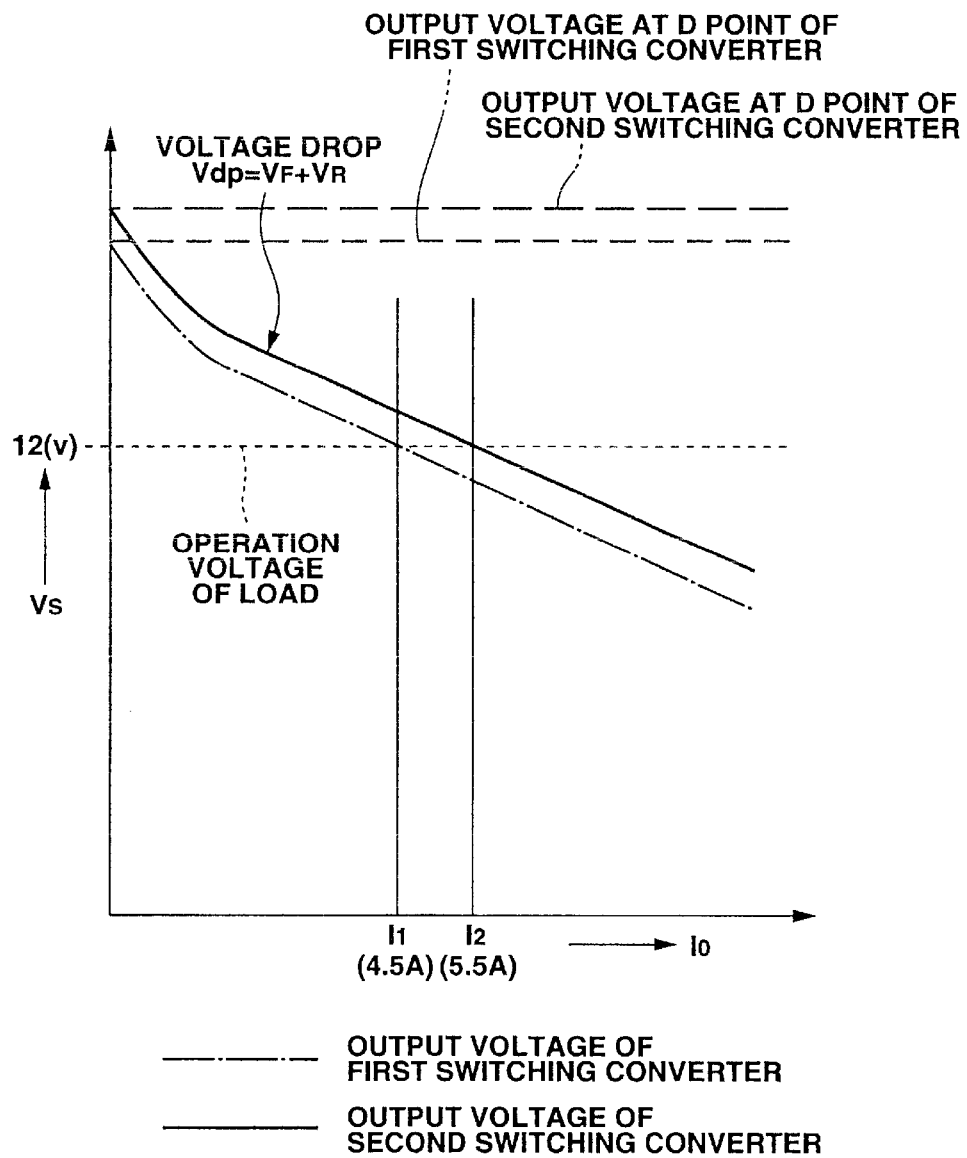
FIG. 3 shows the output characteristics of the conventional power supply system in case the resistance value of the output resistor is made large.
Figure 4:
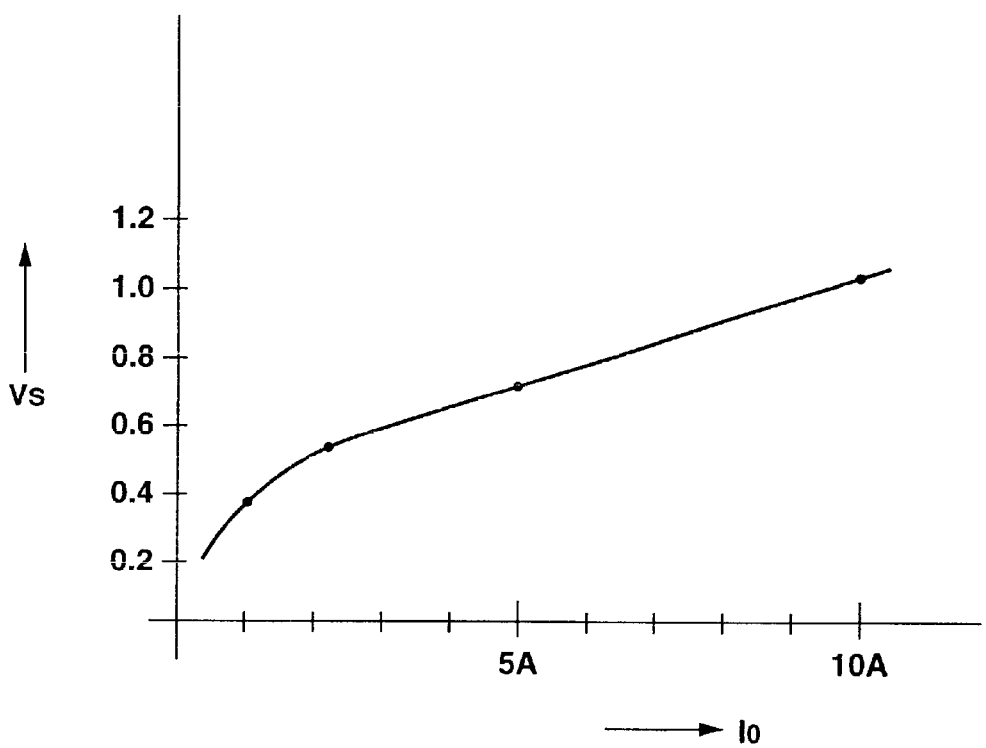
FIG. 4 shows the volt-ampere characteristics of a Schottky diode.
Figure 5:
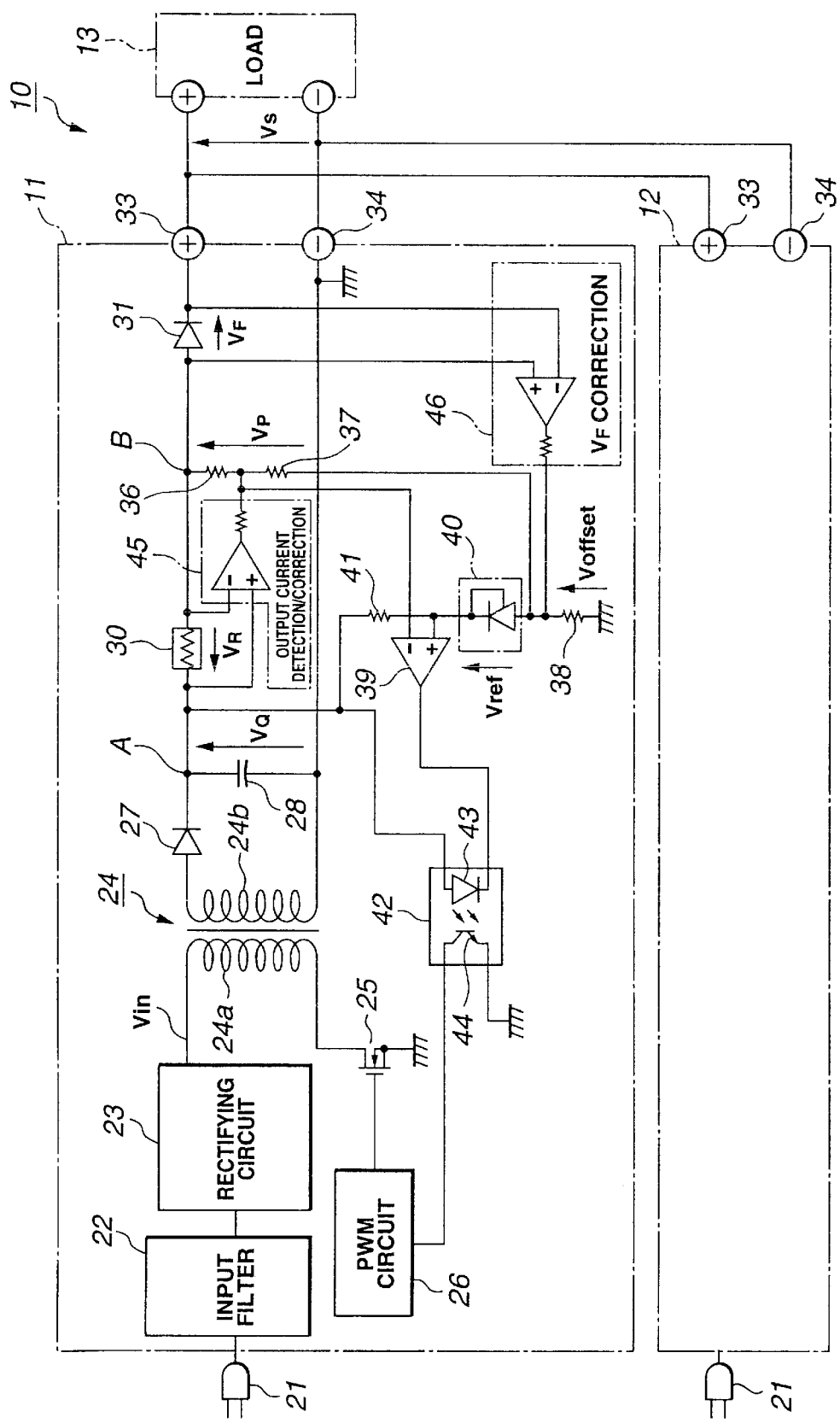
FIG. 5 shows a circuit diagram of a power supply system employing the present invention.

Referring now to FIG. 5, there is illustrated the first embodiment of the power supply system according to the present invention. The power supply system is generally indicated with a reference 10. As shown, the power supply system 10 is composed of two flyback type switching converters connected in parallel to each other.

As shown, the power supply system 10 includes a first switching converter 11 and a second switching converter 12, which are connected in parallel to a load 13. The first and second switching converters 11 and 12 are identical in circuit configuration to each other. Therefore, the circuit configuration of only the first switching converter 11 will be explained hereinafter.

The first switching converter 11 includes an AC input terminal 21, an input filter 22 and a rectifying circuit 23.

The first switching converter 11 is supplied with, for example, a commercial AC power by applying a commercial AC voltage to the AC input terminal 21. The AC voltage is then applied to the input filter 22. The input filter 22 is provided to remove a power noise from the input AC voltage, and then the AC voltage with no power noise is applied to the rectifying circuit 23. The rectifying circuit 23 rectifies the AC voltage to provide a DC input voltage ($V_{in}$) of a predetermined value.

The first switching converter 11 further includes a transformer 24 having a primary winding 24a and a secondary winding 24b, a switching element 25, a pulse width modulating (PWM) circuit 26, a rectifier diode 27 and a smoothing capacitor 28.

The primary winding 24a of the transformer 24 has one end thereof connected to the rectifying circuit 23 which applies the DC input voltage ($V_{in}$) to that end of the primary winding 24a. The primary winding 24a of the transformer 24 has the other end thereof connected to the ground via the switching element 25. The switching element 25 is, for example, an FET. The switching element 25 has the gate thereof connected to the PWM circuit 26, and is driven in a pulsed manner by a PWM signal supplied from the PWM circuit 26. The switching element 25 is pulse-driven by the PWM signal to switch a current through the primary winding 24a of the transformer 24.

The secondary winding 24b of the transformer 24 has one end thereof connected to the ground. The secondary winding 24b of the transformer 24 has the other end thereof, not connected to the ground, connected to the anode of the rectifier diode 27. The rectifier diode 27 has the cathode thereof connected to the ground via the smoothing capacitor 28. The connection point at which the cathode of the rectifier diode 27 and the smoothing capacitor 28 are connected to each other will be referred to as A point.

At the secondary winding 24b of the transformer 24, a voltage is induced from the primary winding 24a due to the switching operation of the switching element 25. The rectifier diode 27 rectifies, and the smoothing capacitor 28 smooths, the voltage induced at the secondary winding 24b to generate a DC voltage ($V_Q$) at the A point.

The first switching converter 11 further includes a current detecting resistor 30, a reverse flow-preventive diode 31, a positive output terminal 33 and a negative output terminal 34.

The current detecting resistor 30 has one end thereof connected to the A point, and has the other end thereof connected to the anode of the reverse flow-preventive diode 31. The reverse flow-preventive diode 31 has the cathode thereof connected to the positive output terminal 33. The negative output terminal 34 is connected to the ground. The connection point at which the anode of the reverse flow-preventive diode 31 and the current detecting resistor 30 are connected to each other will be referred to as B point. It is assumed that a voltage generated at the current detecting resistor 30 is $V_R$, and a forward voltage of the reverse flow-preventive diode 31 is $V_F$.

The current detecting resistor 30 is provided to detect an output current from the positive output terminal 33. The reverse flow-preventive diode 31 prevents a current from reversely flowing from outside via the positive output terminal 33.

The first switching converter 11 further includes a voltage divider 36 and a voltage divider 37 connected in series to each other, an offset resistor 38, a differential amplifier 39 to detect output voltage error, a reference voltage source 40 to generate a reference voltage ($V_{ref}$), a resistor 41, a photocoupler 42 consisting of a light emitting diode 43 and a phototransistor 44, an output current detecting/correcting circuit 45 and a $V_F$ correcting circuit 46.

The voltage divider 36 has one end thereof connected to the B point, and has the other end thereof connected to the voltage divider 37. The voltage divider 37 has one end thereof, not connected to the voltage divider 36, connected to the ground via the offset resistor 38. The connection point between the voltage dividers 36 and 37 is connected to the inverting input terminal of the differential amplifier 39. The reference voltage source 40 has a negative terminal connected to the ground via the offset resistor 38. The reference voltage source 40 has a positive terminal connected to the non-inverting input terminal of the differential amplifier 39 and to the A point via the resistor 41. The light emitting diode 43 of the photocoupler 42 has the anode and cathode thereof connected to the A point and the output terminal of the differential amplifier 39, respectively. The phototransistor 43 of the photocoupler 42 has the emitter and collector thereof connected to the ground and PWM circuit 26, respectively.

The output current detecting/correcting circuit 45 detects the generated voltage ($V_R$), of the current detecting resister 30, and supplies a correction current which increases and decreases in proportion to the generated voltage $V_R$ to the voltage divider 37. That is, a correction current in proportion to the generated voltage ($V_R$) is supplied to the voltage divider 37 from the output current detecting/correcting circuit 45.

The $V_F$ correcting circuit 46 detects the forward voltage $V_F$ of the reverse flow-preventive diode 31, and supplies a correction current in proportion to the forward voltage $V_F$ to the offset resistor 38.

The differential amplifier 39 is supplied at the inverting input terminal thereof with a voltage summing a voltage produced by dividing the DC voltage ($V_P$) at the B point at a ratio of voltage division between the voltage dividers 36 and 37 and a voltage generated at the voltage divider 37 due to the correction current from the output current detecting/correcting circuit 45.

Also, the differential amplifier 39 is supplied at the non-inverting input terminal thereof with a voltage ($V_{ref}$+$V_{offset}$) summing the reference voltage ($V_{ref}$) generated by the reference voltage source 40 and the offset voltage ($V_{offset}$) generated by the $V_F$ correcting circuit 46. The differential amplifier 39 amplifies a difference in voltage between the non-inverting and inverting input terminals thereof to provide a difference voltage, namely, an error voltage. The error voltage is applied to the PWM circuit 26 via the photocoupler 42. The PWM circuit 26 vanes the duty ratio of the PWM signal to decrease the on-period when the error voltage is negative, and increase the on-period when the error voltage is positive, and switch the switching element 25 such that the DC voltage generated at the B point is stabilized at a constant level.

The first switching converter 11 constructed as in the above can provide a stable DC output voltage ($V_S$) between the positive and negative output terminals 33 and 34.

In the power supply system 10 according to the first preferred embodiment of the present invention, the first and second switching converters 11 and 12 are connected in parallel to the load 13, and supplies the load 13 with a power.

More specifically, the positive output terminal 33 of the first switching converter 11 and the positive output terminal 33 of the second switching converter 12 are connected to each other and to the positive power input terminal of the load 13. Furthermore, the negative output terminal 34 of the first switching converter 11 and the negative output terminal 34 of the second switching converter 12 are connected to each other and to the negative power input terminal of the load 13.

As in the above, the first embodiment of the power supply system 10 supplies the load 13 with a power which is larger than that generated by one switching converter. Furthermore, if any one of the switching converters fails, the power supply system 10 can be backed up by the other normal one.

Next, the $V_F$ correcting circuit 46 will further be explained below.

Figure 6:
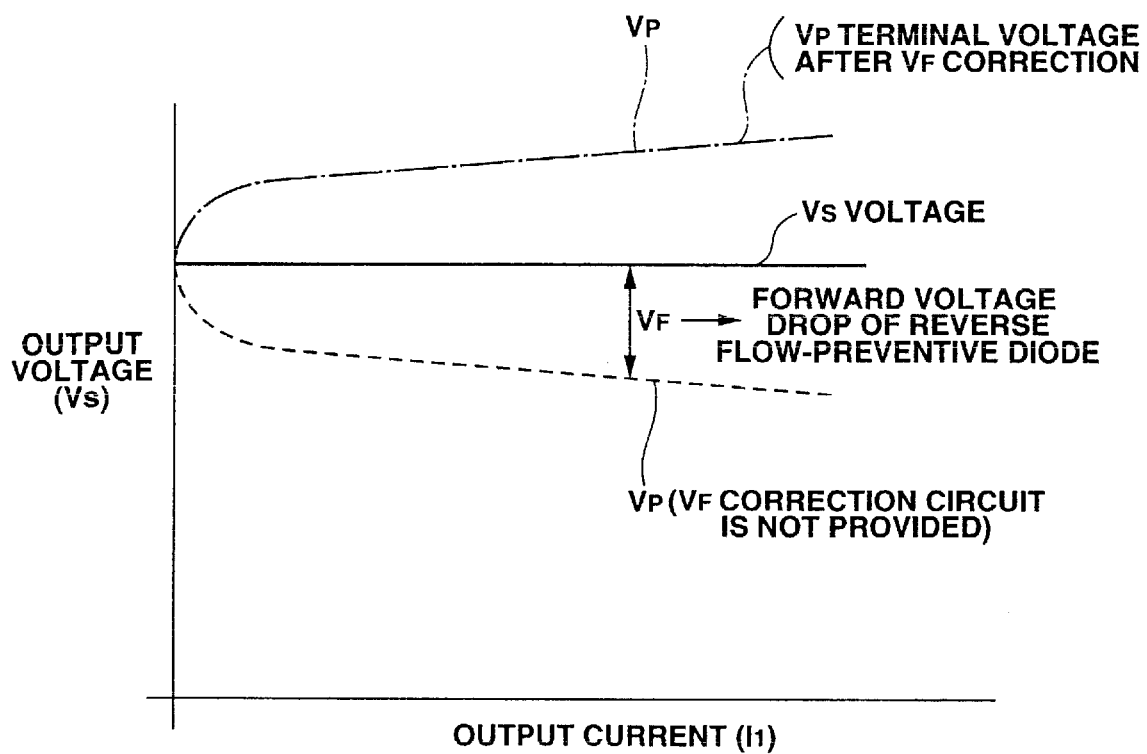
FIG. 6 shows the correction characteristics of an output voltage in case a $V_F$ correcting circuit is used.

FIG. 6 shows the volt-ampere characteristics of the first switching converter 11, where $I_1$ is output current and $V_S$ is output voltage of the first switching converter 11. In case both of the $V_F$ correcting circuit 46 and output current detecting/correcting circuit 45 do not work, the volt-ampere characteristics is shown by a lower dotted line in FIG. 6. That is, since the first switching converter 11 is controlled in a feedback manner so that the DC voltage ($V_P$) at the B point remains constant, dropped voltage $V_S$ corresponding to the forward voltage $V_F$ of the reverse flow-preventive diode 31 provided between the B point and the positive output terminal 33 is generated.

Then, $V_F$ correcting circuit 46 detects the forward voltage $V_F$ of the reverse flow-preventive diode 31, and generates a correction current in proportion to the forward voltage $V_F$, and supplies the correction current to the offset resistor 38. When the correction current is supplied, the offset resistor 38 generates an offset voltage $V_{offset}$ to raise the reference voltage $V_{refe}$. That is, there is generated the voltage ($V_{ref}$+$V_{offset}$) summing the reference voltage ($V_{ref}$) generated by the reference voltage source 40 and the offset voltage ($V_{offset}$) generated from the $V_F$ correcting circuit 46, as shown by an upper dotted line in FIG. 6, which can make the DC voltage ($V_P$) at the B point constant. Accordingly, the dropped voltage corresponding to the forward voltage $V_F$ of the reverse flow-preventive diode 31 is offset, and the output voltage $V_S$ generated at the positive output terminal 33 remains constant regardless of the temperature and output current $I_1$, as shown by a straight line in FIG. 6.

Figure 7:
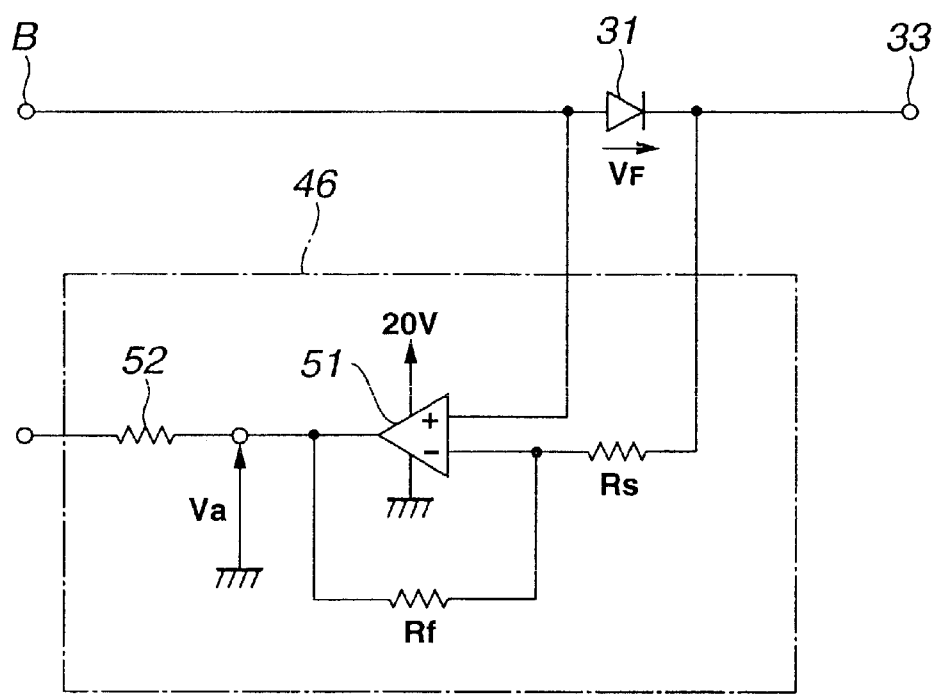
FIG. 7 shows a circuit configuration of the $V_F$ correcting circuit.

The $V_F$ correcting circuit 46 may be formed by using an inverting/amplifying circuit of an operational amplifier, as shown in FIG. 7

The reverse flow-preventive diode 31 has the anode thereof connected to a non-inverting input terminal of an operational amplifier 51, and has the cathode thereof to an inverting input terminal of the operational amplifier 51 via an input resistor Rs. The output terminal of the operational amplifier 51 is connected to the inverting input terminal thereof via the feedback resistor Rf.

An output voltage (Va) of the operational amplifier 51 will be expressed as follows.

$$Va = (1 + Rf/Rs) \times V_F$$

For example, when the Rs=10 kΩ and the Rf=250 kΩ, the Va=26×$V_F$.

Figure 8:
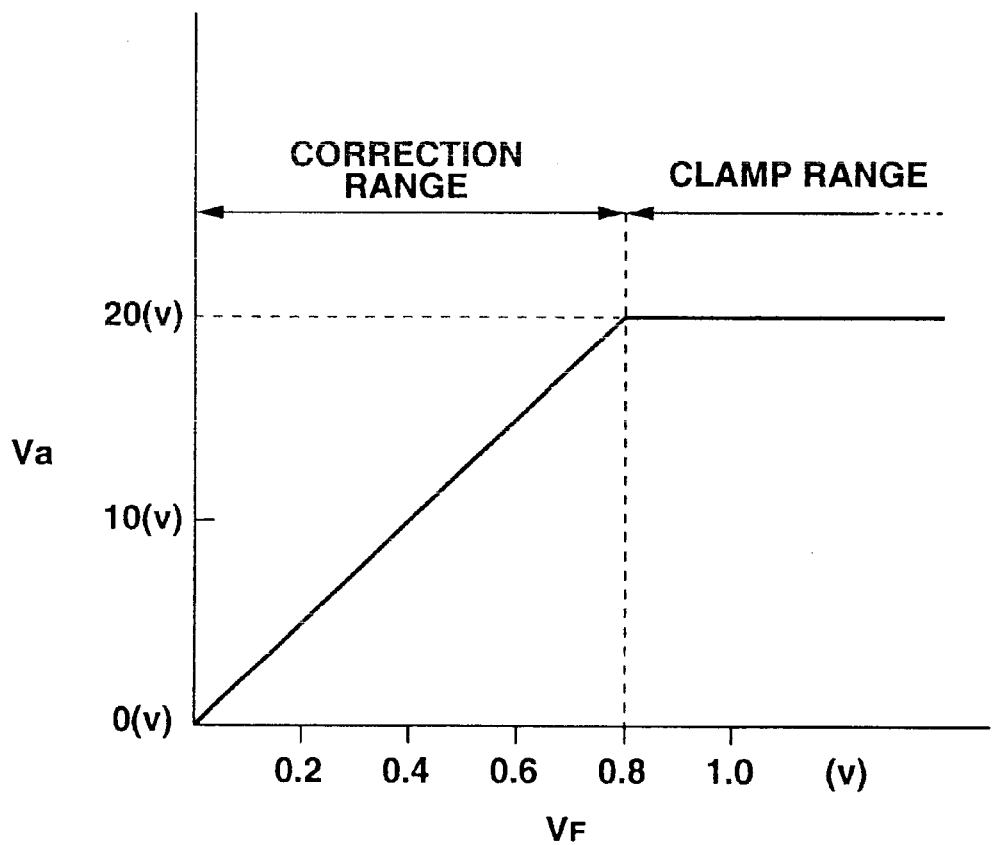
FIG. 8 shows an input/output characteristics the $V_F$ correcting circuit.

The output characteristics between the forward voltage $V_F$ of the reverse flow-preventive diode 31 and the output voltage (Va) of the operational amplifier 51 will be shown in FIG. 8.

For example, it is assumed that a power supply voltage of the operational amplifier 51 is single +20 V. In this case, when the forward voltage $V_F$ of the reverse flow-preventive diode 31 increases in the range of 0 to 0.8 V, the output voltage (Va) of the operational amplifier 51 increases linearly. On the other hand, when the forward voltage $V_F$ of the reverse flow-preventive diode 31 increases in the range of more than 0.8 V, the output voltage (Va) of the operational amplifier 51 is clamped at 20 V. By thus clamping the output voltage (Va), even though the forward voltage $V_F$ of the reverse flow-preventive diode 31 increases abnormally due to trouble or damage, the voltage of the B point ($V_P$) can be prevented from being raised abnormally.

The conditions for clamping the output voltage (Va) will be expressed as follows. That is, when the maximum value of the forward voltage $V_F$ of the reverse flow-preventive diode 31 is $V_{FMAX}$, the maximum output voltage of the operational amplifier 51 is $Va_{MAX}$, the increase ratio G of the operational amplifier 51 will be as follows.

$$G = Va_{MAX}/V_{FMAX}$$

Then, the $V_F$ correcting circuit 46 detects the forward voltage $V_F$ of the reverse flow-preventive diode 31, and supplies the correction current in proportion to the detected forward voltage $V_F$ to the offset resistor 38 via an output resistor 52.

As a result, the dropped voltage corresponding to the forward voltage $V_F$ of the reverse flow-preventive diode 31 is offset, and the output voltage $V_S$ generated at the positive output terminal 33 remains constant regardless of the temperature and output current $I_1$, as shown in FIG. 6.

Next, the output current detecting/correcting circuit 45 will further be explained below.

The output current detecting/correcting circuit 45 is provided to control the first switching converter 11 and second switching converter 12 so that the output voltage is dropped linearly in accordance with the output current, and removes error between the output voltages of the first switching converter 11 and second switching converter 12.

There is generated the voltage ($V_R$) in proportion to the output current at the current detecting resistor 30. The output current detecting/correcting circuit 45 detects the voltage ($V_R$) generated at the current detecting resistor 30, and generates a correction current in proportion to the generated voltage ($V_R$). Then the voltage of the connection point between the voltage divider 36 and voltage divider 37 is raised in proportion to the applied correction current. Thus, the voltage applied to the inverting input terminal of the differential amplifier 39 to detect output voltage error is raised in accordance with the increase of the output current. Accordingly, the first switching converter 11 operates such that the output voltage $V_S$ is proportionally dropped in accordance with the increase of the output current $I_1$.

Figure 9:
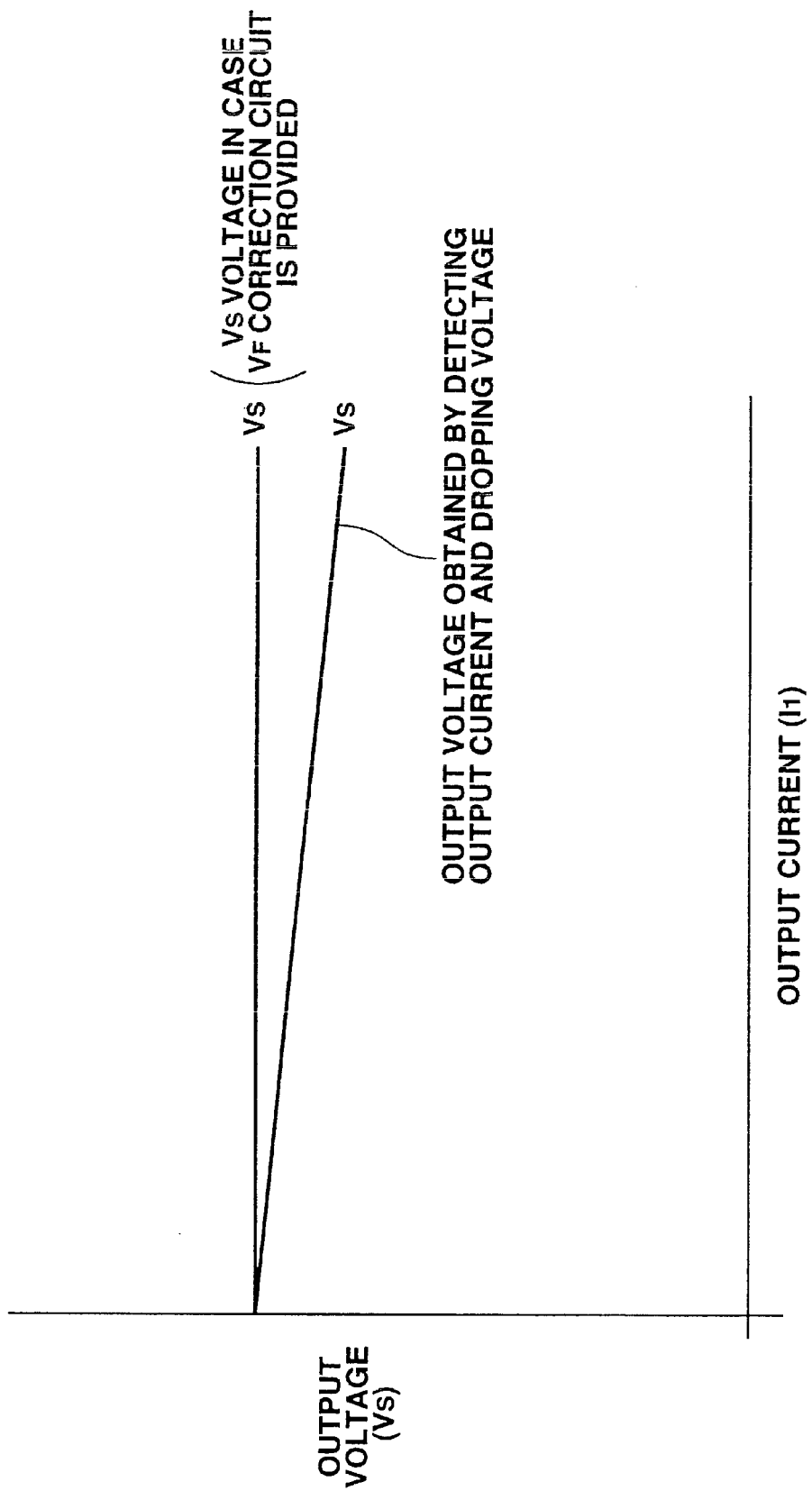
FIG. 9 shows the correction characteristics in case an output current detecting/correcting circuit is used.

As in the above, since the power supply system 10 according to the present invention is provided with the output current detecting/correcting circuit 45 and $V_F$ correcting circuit 46, the output voltage $V_S$ is dropped linearly in accordance with the increase of the output current $I_1$, as shown in FIG. 9.

The power supply system 10 performs stability controlling of the switching voltage by detecting the forward voltage $V_F$ of the reverse flow-preventive diode 31 and correcting the dropped voltage corresponding to the forward voltage $V_F$. Thus, the power supply system 10 can generate an output voltage $V_S$ which is not affected by the forward voltage drop of the reverse flow-preventive diode 31 and fluctuation of the temperature.

Furthermore, since the power supply system 10 detects the output current and drops the output voltage $V_S$ in proportion to the detected output current, the power supply system 10 can remove the affection of resistance fluctuation of the output resistors for the voltage drop and that of line resistance for each set, and the affection of fluctuation of the temperature characteristics. Thus, linear voltage drop characteristics can be obtained. Conventionally, the linear voltage drop depends on a resistance value of a resistor itself. On the other hand, in the power supply system 10, the resistance value of the current detecting resistor 30 can be selected freely. Thus, standard resistors available from general manufacturers can be used, and inexpensive resistors can be used.

Figure 10:
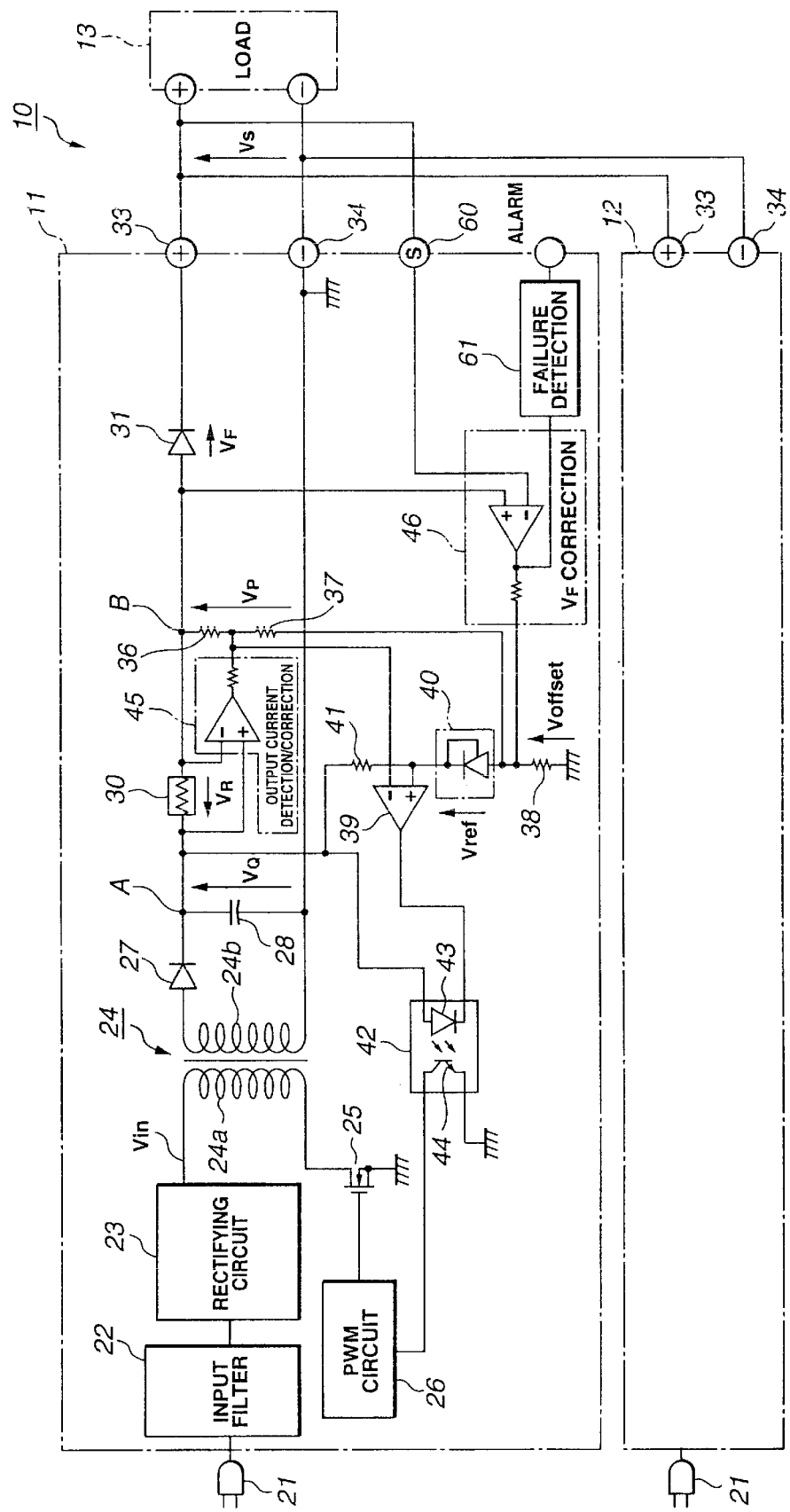
FIG. 10 shows a circuit diagram of a power supply system employing the present invention, in which a sense terminal and a failure detecting circuit are provided.

FIG. 10 shows the power supply system 10 which is provided with a sense terminal 60. The power supply system 10 having the sense terminal 60 can correct the fluctuation of the voltage drop of each of the switching converters due to the fluctuation of resistance value of line resistance generated according to the condition of lines by detecting the voltage drop from the anode of the reverse flow-preventive diode 31 to the positive terminal of the load 13 and correcting it.

The power supply system 10 may be provided with a failure detecting circuit 61 which detects the output voltage Va of the operational amplifier in the $V_F$ correcting circuit 46, and senses whether the reverse flow-preventive diode 31 operates correctly, as shown in FIG. 10.

Figure 11:
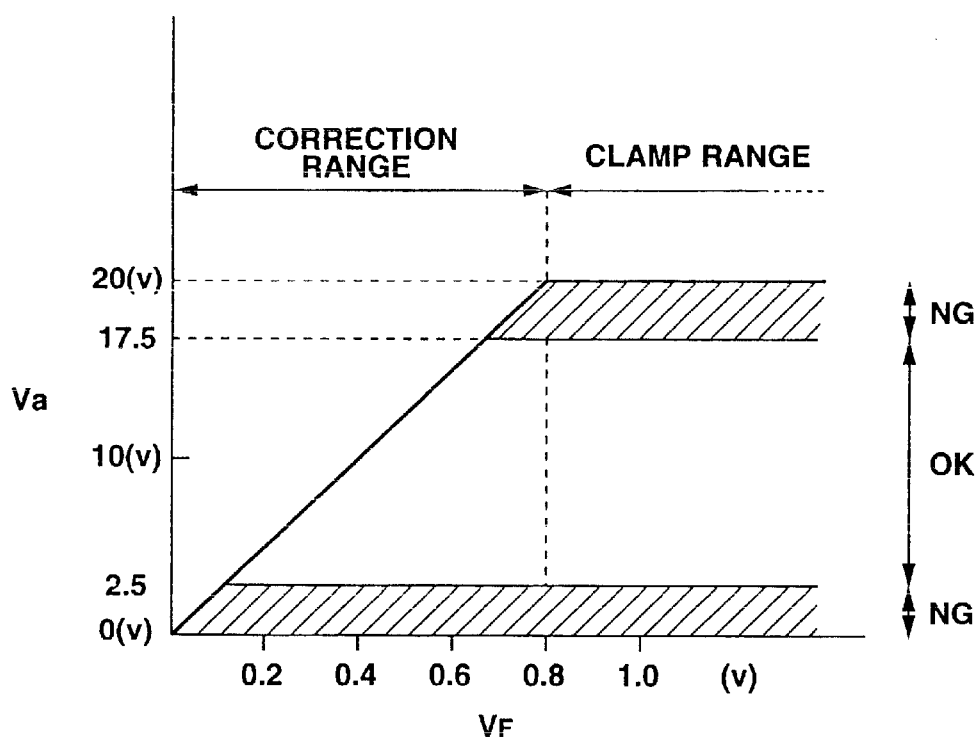
FIG. 11 shows ranges where the failure detecting circuit can find failures.

FIG. 11 shows ranges where the failure detecting circuit 61 can find failures. As shown FIG. 11, the failure detecting circuit 61 senses whether the output voltage Va is 17.5 V or more, otherwise, the output voltage Va is 2.5 V or less. In case the output voltage Va of the operational amplifier is 2.5 V or less, the failure detecting circuit 61 determines that the forward voltage $V_F$ of the reverse flow-preventive diode 31 is too small, and outputs an alarm signal. On the other hand, in case the output voltage Va of the operational amplifier is 17.5 V or more, the failure detecting circuit 61 determines that the forward voltage $V_F$ of the reverse flow-preventive diode 31 is too large, and also outputs an alarm signal. By thus sensing the output voltage Va of the operational amplifier in the $V_F$ correcting circuit 46, failures such as a short circuit or break can be found. And power which is being supplied can be automatically suspended by sending the alarm signal to a controlling unit. So, the safety and reliability for the user can be improved. The maximum voltage value of 17.5 V and the minimum voltage value of 2.5 V are examples, and the maximum and minimum values are not restricted to those values.

As has been described heretofore, in the power supply apparatus according to the present invention, the diode provided between the DC voltage source and the output terminal works as a reverse flow-preventive diode. And a DC voltage generated from the DC voltage source is controlled so that the anode potential of the diode remains constant, and the output terminal voltage is dropped in accordance with the forward current detected by the forward current detection means, and the anode potential of the diode is raised in accordance with the forward voltage detected by the forward voltage detection means. Thus, the power supply apparatus is not affected by a voltage fluctuation of the reverse flow-preventive diode provided in an output line thereof Also, the output voltage is dropped linearly in proportion to the output current, and stable output characteristics with high accuracy can be obtained.

Furthermore, in the power supply system according to the present invention, the diode provided between the DC voltage source and the output terminal of each of the power supply apparatuses works as a reverse flow-preventive diode. And a DC voltage generated from the DC voltage source is controlled so that the anode potential of the diode remains constant, and the output terminal voltage is dropped in accordance with the forward current detected by the forward current detection means, and the anode potential of the diode is raised in accordance with the forward voltage detected by the forward voltage detection means. Thus, each of the power supply apparatuses is not affected by a voltage fluctuation of the reverse flow-preventive diode provided in an output line thereof. Also, the output voltage is dropped linearly in proportion to the output current, and stable output characteristics with high accuracy can be obtained.

What is claimed is:

1. A power supply apparatus comprising:
    a DC voltage source;
    an output terminal to supply a power to an external load, the external load being connected to the output terminal;
    a diode provided between the DC voltage source and the output terminal, the diode having the anode thereof connected to the DC voltage source and having the cathode thereof connected to the output terminal;
    means for detecting a forward voltage of the diode;
    means for detecting a forward current of the diode; and
    means for controlling a DC voltage generated from the DC voltage source;
    the control means controlling a DC voltage generated from the DC voltage source so that the anode potential of the diode remains constant, and dropping the output terminal voltage in accordance with the forward current detected by the forward current detection means, and raising the anode potential of the diode in accordance with the forward voltage detected by the forward voltage detection means; and
    wherein the control means controls a DC voltage generated from the DC voltage source in accordance with a differential voltage between a reference voltage source and the anode potential of the diode, and raises the anode potential of the diode by adding the forward voltage detected by the forward voltage detection means to a reference voltage of the reference voltage source.

2. The power supply apparatus as set forth in claim 1, wherein the control means halts raising the anode potential of the diode when the forward voltage of the diode surpasses a predetermined value.

3. The power supply apparatus as set forth in claim 1, further comprising:
    means for sensing that the forward voltage of the diode surpasses a predetermined value.

4. The power supply apparatus as set forth in claim 1, wherein the control means drops the output terminal voltage in proportion to the forward current detected by the forward current detection means.

5. A power supply system having a plurality of power supply apparatuses connected in parallel to an external load, each of the power supply apparatuses comprising:
    a DC voltage source;
    an output terminal to supply a power to an external load, the external load being connected to the output terminal;
    a diode provided between the DC voltage source and the output terminal, the diode having the anode thereof connected to the DC voltage source and having the cathode thereof connected to the output terminal;
    means for detecting a forward voltage of the diode;
    means for detecting a forward current of the diode; and
    means for controlling a DC voltage generated from the DC voltage source;
    the control means controlling a DC voltage generated from the DC voltage source so that the anode potential of the diode remains constant, and dropping the output terminal voltage in accordance with the forward current detected by the forward current detection means, and raising the anode potential of the diode in accordance with the forward voltage detected by the forward voltage detection means; and
    wherein the control means of each of the power supply apparatuses controls a DC voltage generated from the DC voltage source in accordance with a differential voltage between a reference voltage source and the anode potential of the diode, and raises the anode potential of the diode by adding the forward voltage detected by the forward voltage detection means to a reference voltage of the reference voltage source.

6. The power supply system as set forth in claim 5, wherein the control means of each of the power supply apparatuses halts raising the anode potential of the diode when the forward voltage of the diode surpasses a predetermined value.

7. The power supply system as set forth in claim 5, each of the power supply apparatuses further comprising:
    means for sensing that the forward voltage of the diode surpasses a predetermined value.

8. The power supply system as set forth in claim 5, wherein the control means of each of the power supply apparatuses drops the output terminal voltage in proportion to the forward current detected by the forward current detection means.

* * * * *